US006190598B1

(12) United States Patent
Murphy et al.

(10) Patent No.: US 6,190,598 B1
(45) Date of Patent: Feb. 20, 2001

(54) METHOD FOR MAKING THERMOPLASTIC COMPOSITE PRESSURE VESSELS

(75) Inventors: James C. Murphy, Chardon, OH (US); Gerald S. Boyce, Nottingham (GB); Erik Coeckelbergs, Wechelderzande (BE)

(73) Assignee: Essef Corporation, Cincinnati, OH (US)

(*) Notice: Under 35 U.S.C. 154(b), the term of this patent shall be extended for 0 days.

(21) Appl. No.: 09/152,169

(22) Filed: Sep. 11, 1998

(51) Int. Cl.[7] .......................... B29C 51/28; B29C 51/42; B29D 9/00; B29D 22/00; B32B 31/26
(52) U.S. Cl. .................. 264/314; 264/533; 428/34.5; 428/34.6; 428/34.7; 428/36.3
(58) Field of Search ...................... 264/314, 533; 428/34.5, 34.6, 34.7, 36.3

(56) References Cited

U.S. PATENT DOCUMENTS

| H1261 | 12/1993 | Gibson et al. | |
|---|---|---|---|
| 3,091,000 | 5/1963 | Makowski | 18/59 |
| 3,137,898 | 6/1964 | Geringer | 18/45 |

FOREIGN PATENT DOCUMENTS

| 2347776A | * | 4/1975 | (DE) . |
|---|---|---|---|
| 4215756 | | 11/1993 | (DE) . |
| 0635672 | | 1/1995 | (EP) . |
| 859554 | * | 1/1961 | (GB) . |
| 53-34870 | | 3/1978 | (JP) . |
| 59-05035 | | 11/1984 | (JP) . |
| WO9851480 | | 11/1998 | (WO) . |

Primary Examiner—Ellis Robinson
Assistant Examiner—Sandra M. Nolan
(74) Attorney, Agent, or Firm—Michael A. Lechter; David E. Rogers; Squire, Sanders & Dempsey

(57) ABSTRACT

A process of making a composite vessel with superior mechanical and aesthetic characteristics includes the steps of: A) preforming a composite thermoplastic shell (e.g., by winding a commingled roving of fiberglass and a thermoplastic material onto a thermoplastic liner) having an opening for access to the interior; B) placing the shell (which may optionally be preheated) into a mold (which itself may optionally be preheated); C) introducing an inflatable bag containing a heater into the shell through the opening; D) heating the inflatable bag to a temperature which is sufficient to render the shell fluid while pressurizing the interior of the inflatable bag; E) continuing step D) until the shell forms against the interior walls of the mold; F) allowing the formed composite vessel to cool; G) removing the inflatable bag; and H) removing the formed composite vessel from the mold. Prior to step C), an insert having an opening may be juxtaposed in alignment with the opening in the shell such that, during step C), the inflatable bag is inserted through the opening in the insert. If desired for the intended purpose of the composite vessel, a portion of the exterior surface of the insert may be threaded such that threads are formed in the opening of the shell whereby the insert can be unscrewed leaving a threaded port into the vessel.

24 Claims, 19 Drawing Sheets

U.S. PATENT DOCUMENTS

| | | | |
|---|---|---|---|
| 3,177,105 | 4/1965 | Wiltshire | 156/218 |
| 3,426,940 | 2/1969 | Broerman | 220/83 |
| 3,649,409 | 3/1972 | Bell et al. | 156/294 |
| 3,816,578 | 6/1974 | Fuller | 264/98 |
| 3,937,781 * | 2/1976 | Allen | 264/314 |
| 3,962,393 | 6/1976 | Blad | 264/257 |
| 3,970,495 | 7/1976 | Ashton et al. | 156/162 |
| 4,126,659 | 11/1978 | Blad | 264/90 |
| 4,169,749 | 10/1979 | Clark | 156/156 |
| 4,256,231 | 3/1981 | Cioc et al. | 264/510 |
| 4,267,142 | 5/1981 | Lankheet | 264/512 |
| 4,327,052 | 4/1982 | Sauer | 156/156 |
| 4,549,920 | 10/1985 | Cogswell et al. . | |
| 4,576,776 * | 3/1986 | Anderson | 264/510 |
| 4,584,041 | 4/1986 | Lyman et al. | 220/3 |
| 4,589,563 | 5/1986 | Born | 220/414 |
| 4,619,374 | 10/1986 | Yavorsky | 156/293 |
| 4,740,262 | 4/1988 | Yavorsky et al. | 264/102 |
| 4,876,050 | 10/1989 | Horton | 220/589 |
| 4,940,563 * | 7/1990 | Kromrey | 264/257 |
| 4,961,977 | 10/1990 | Archer et al. . | |
| 5,009,941 | 4/1991 | Pollet et al. . | |
| 5,012,950 * | 5/1991 | Knappe | 220/459 |
| 5,025,943 | 6/1991 | Forsman | 264/515 |
| 5,049,349 | 9/1991 | McCullough et al. | 220/414 |
| 5,085,821 * | 2/1992 | Nohara | 264/515 |
| 5,150,812 | 9/1992 | Adams | 220/414 |
| 5,202,165 | 4/1993 | Lusignea et al. | 428/1 |
| 5,208,051 | 5/1993 | Berg et al. | 425/393 |
| 5,227,236 | 7/1993 | Handermann . | |
| 5,242,517 | 9/1993 | Endoh | 156/92 |
| 5,287,987 | 2/1994 | Gaiser | 220/589 |
| 5,342,463 | 8/1994 | Addeo et al. | 156/156 |
| 5,358,683 | 10/1994 | Rhodes . | |
| 5,385,262 | 1/1995 | Coquet et al. | 220/589 |
| 5,518,141 | 5/1996 | Newhouse et al. | 220/586 |
| 5,556,601 | 9/1996 | Huvey et al. | 156/172 |
| 5,571,357 | 11/1996 | Darrieux et al. | 156/173 |
| 5,575,875 | 11/1996 | Brittingham . | |
| 5,672,309 | 9/1997 | Masui et al. . | |
| 5,763,027 | 6/1998 | Enders et al. | 428/34.7 |
| 5,816,436 | 10/1998 | Grosjean et al. | 220/590 |
| 5,817,203 | 10/1998 | Moser | 156/155 |
| 5,862,938 | 1/1999 | Burkett | 220/590 |
| 5,900,107 * | 5/1999 | Murphy et al. | 156/359 |

* cited by examiner

METHOD FOR MAKING THERMOPLASTIC COMPOSITE PRESSURE VESSELS

FIELD OF THE INVENTION

This invention relates to the art of fabricating pressure vessels and, more particularly, to improved methods for fabricating composite pressure vessels and to composite pressure vessels made in accordance with the improved methods.

BACKGROUND OF THE INVENTION

Pressure vessels, such as hot water heaters, boilers, pressurized gas tanks and the like, have traditionally been fabricated from metal such as steel. However, in recent years, the use of composite pressure vessels has become more prevalent. These composite pressure vessels have typically been fabricated by a filament winding process which utilizes thermoset plastic resins such as epoxies, polyesters and vinylesters. Briefly, this technology is the process of impregnating dry fibers, such as fiberglass strands, with catalyzed resin prior to application to a mandrel. Preimpregnated fibers "prepreg") may also be used. The mandrel and applied composite are then cured, at ambient temperature or with heat, to set-up the laminate and obtain a hard resin and fiber laminate shell. This shell is either removed from the mandrel or the mandrel itself becomes part of the finished product. Although the specific product application determines the exact function of the resin, in all cases, in all cases it serves as the support structure for keeping the continuous fiber strands in position.

The thermoset resins used in these processes can be categorized as of the low temperature commodity type which are characterized by their relative ease of use, low cost and availability. These resins have long served to meet the performance requirements of a wide range of pressure vessel products. However, these resin systems have well known drawbacks which may include their limited temperature capabilities, unsatisfactory finished product aesthetics, lack of extended durability, lack of appropriateness for recycling and manufacturing related issues such as downtime due to clean-up and material handling costs. Further, there are environmental concerns arising from worker exposure to vapor, overspray, emissions, etc. encountered during the fabrication processes. Some engineered thermoset resins improve performance through higher temperature capability, but unacceptable material costs are associated with them.

In addition, because of the materials and processes employed, composite pressure vessels prepared according to the prior art processes inherently have residual and significant internal stresses which, along with certain temperature sensitive incompatibilities of the materials, limit the pressure and temperature ranges in which the pressure vessels find use.

Thus, increasing performance demands, environmental issues, manufacturing issues and new market opportunities have emphasized the limitations of the use of thermoset resins in the manufacture of composite pressure vessels. Composite pressure vessels with higher temperature and pressure capabilities, improved appearance and greater durability and impact resistant characteristics and which, as to fabrication, are more environmentally-friendly, more cost effective and present fewer manufacturing issues, are accordingly highly desirable.

Therefore, it will be recognized by those skilled in the art that a process for fabricating composite pressure vessels which achieves improvement in all these areas requires a fundamentally different philosophy. It is to the provision of such a fundamentally improved process, and to pressure vessels made by such process that the present invention is directed and by which the following characteristics are obtained: improved contact at higher temperatures between the fiber and resin, better control over reinforcement/matrix ratio, scrap materials which can be effectively recycled, diminished regulation issues caused by emissions, higher processing speeds for the winding (or other overlaying mode) and curing steps, potential labor savings due to less material handling, floor space reduction, adaptability to automation, a safer environment for employees, simplification of processing lines and of material storage and handling, faster changeover times, faster startups, lower training costs, lower energy costs, etc. Therefore, pressure vessels fabricated according to the process are substantially stress relieved and exhibit improved performance over the prior art pressure vessels in that, inter alia, they can withstand higher pressures and temperatures, are more impact resistant and also have a significantly better finish.

OBJECTS OF THE INVENTION

It is therefore a broad object of this invention to provide an improved process for fabricating a composite pressure vessel.

It is more particular an object of this invention to provide such an improved process which enjoys advantages including, as opposed to prior art processes of fabricating composite pressure vessels: better control over reinforcement/matrix ratio, scrap materials which can be effectively recycled, diminished regulation issues caused by emissions, higher processing speeds for the winding (or alternatives to winding) and curing steps, substantial labor savings due to less material handling, floor space reduction, susceptibility to automation, a safer environment for employees, simplification of processing lines and of material storage and handling, faster changeover times, faster startups, lower training costs, lower energy costs, etc.

In another aspect, it is an object of this invention to provide a process for fabricating composite pressure vessels which, in use, enjoys long term performance at least as good as that of traditional pressure vessels.

In yet another aspect, it is an object of this invention to provide high quality composite pressure vessels fabricated according to new processes.

In still yet another aspect, it is an object of this invention to provide high quality composite pressure vessels which have improved durability, impact resistance and corrosion resistance as well as higher temperature and pressure handling characteristics and which also have good machinability attributes and can therefore readily be welded, cut, drilled, threaded, stamped or the like as may be desired to produce a high quality finished product.

SUMMARY OF THE INVENTION

Briefly, these and other objects of the invention are achieved by employing a process of making a composite vessel which includes the steps of: A) preforming (e.g., by winding a fiber, such as fiberglass, and thermoplastic material, such as filaments, a roving or a yarn) onto a thermoplastic liner) a composite thermoplastic shell for the vessel, which composite thermoplastic shell has at least one opening for access to the interior thereof; B) placing the composite thermoplastic shell (which may optionally be preheated) into a mold (which itself may optionally be independently preheated); C) introducing an inflatable bag containing a heater into the composite thermoplastic shell through the opening; D) heating the inflatable bag to a temperature which is sufficient to render the composite thermoplastic shell fluid while pressurizing the interior such that the exterior surface of the inflatable bag bears against the interior surface of the composite thermoplastic, shell; E) continuing step D) until the composite thermoplastic shell forms against the interior walls of the mold; F) ceasing heating the inflatable bag and allowing the formed composite vessel to cool; G) removing the inflatable bag from the interior of the formed composite vessel; and H) removing the formed composite vessel from the mold. Prior to step C), an insert having an opening may be juxtaposed in alignment with the opening in the composite thermoplastic shell such that, during step C), the inflatable bag is inserted into the interior of the composite thermoplastic shell through the opening in the insert. If desired for the intended purpose of the composite vessel, a portion of the exterior surface of the insert may be threaded such that, during step E), threads are formed in the opening of the composite thermoplastic shell and, subsequent to step F), the insert can be unscrewed and separated from the formed composite vessel leaving a threaded port into the vessel.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

DESCRIPTION OF THE PREFERRED EMBODIMENT(S)

Figure 1:
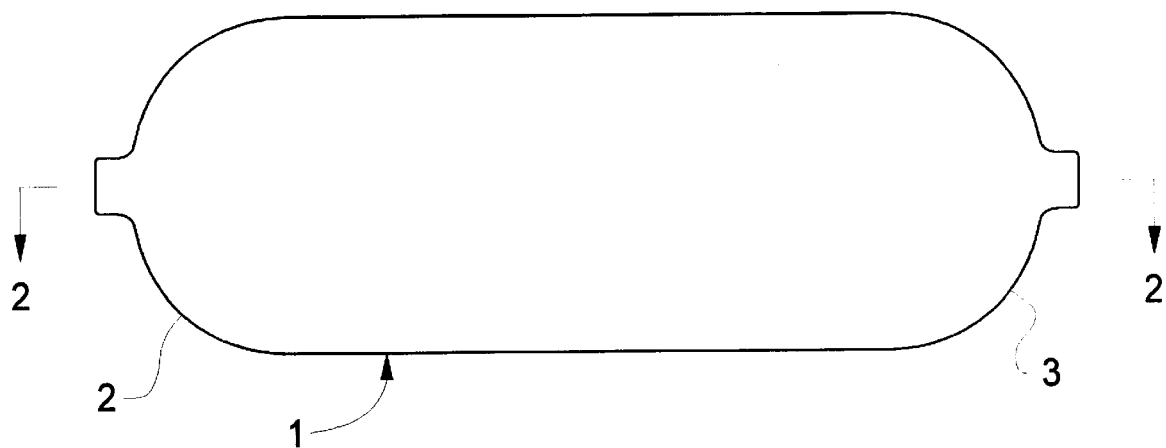
FIG. 1 is a pictorial view of a liner/mandrel employed in practicing a first inventive embodiment.
Figure 2:
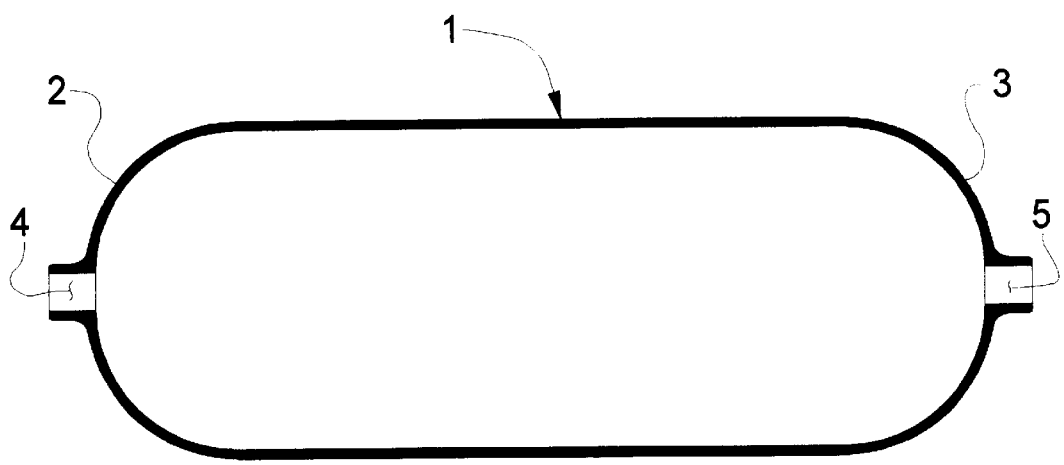
FIG. 2 is a cross sectional view taken along the lines 2—2 of FIG. 1.

Referring first to FIGS. 1 and 2, there is shown a thermoplastic liner/mandrel 1 for a composite pressure vessel to be fabricated according to a first inventive embodiment. In the exemplary embodiment, the liner/mandrel 1 is a generally elongated preformed structure terminating at each end in a dome shape 2, 3 having a central, axial opening 4, 5. Thermoplastic liner 1 may, for example, be made of polypropylene, polyethylene, polybutylene terephthalate, polyethylene terephthalate or fiber (e.g., fiberglass) impregnated polypropylene, polyethylene, polybutylene terephthalate or polyethylene terephthalate or another thermoplastic material with appropriate characteristics and can be prepared by any suitable conventional process such as molding a combination of chopped fiber, directional, woven and/or knitted fiber fabric sewn or welded together in the shape of the vessel and commingled with thermoplastic material.

Figure 3:
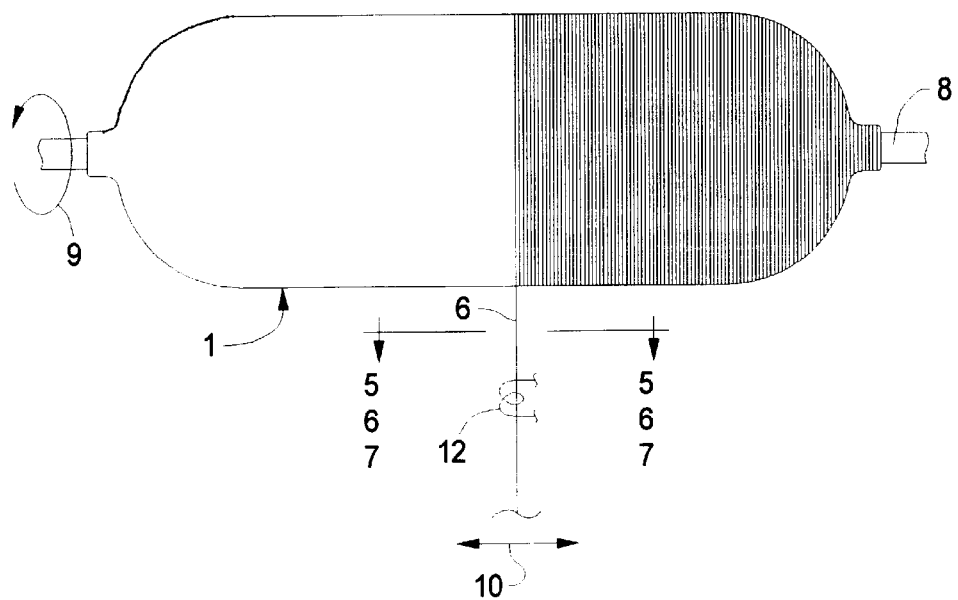
FIG. 3 is a pictorial view of the liner/mandrel shown in FIGS. 1 and 2 being overlaid with a layer of a commingled thermoplastic fiber material.
Figure 4:
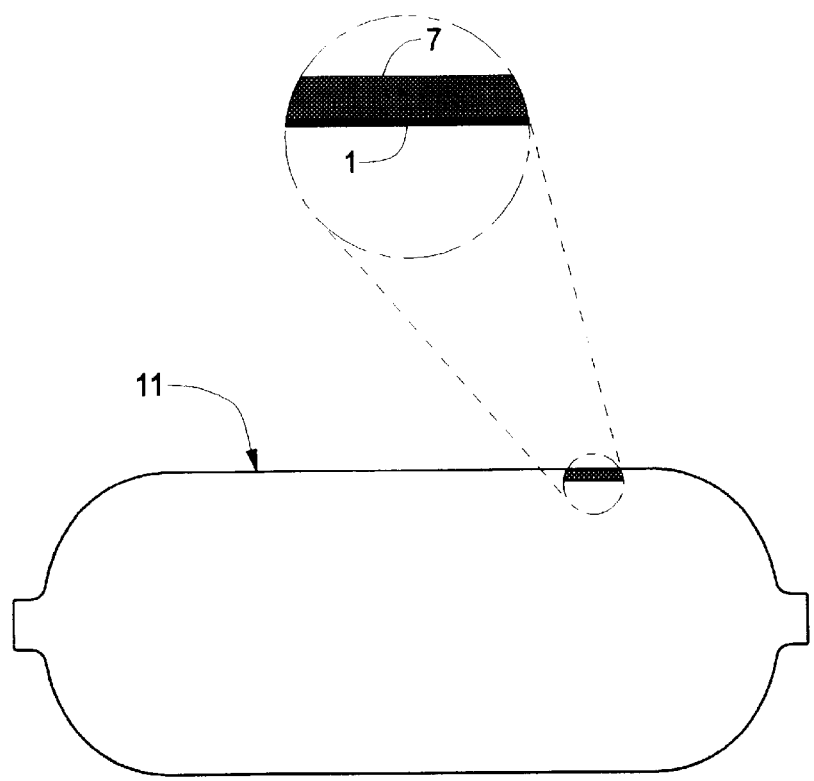
FIG. 4 is a view of the liner after being overlaid with the layer of commingled thermoplastic fiber material and includes an enlarged fragmentary cross sectional view.

As shown in FIG. 3, a filament, roving, yarn or tape 6 of fiber (e.g., fiberglass, carbon fiber, boron fiber, etc.) and a thermoplastic material is methodically wound onto the outer surface of the thermoplastic liner 1 to form a substantially uniform overlay 7 as shown in the enlarged partial cross section in FIG. 4. This step may be carried out, for example, by mounting the thermoplastic liner 1 onto a mandrel 8 and rotating the liner as indicated by the arrow 9 while methodically feeding the filament(s), roving, yam or tape 6 from a laterally and reciprocally traversing source as represented by the double arrow 10 and continuing this procedure until the overlay 7 has reached the desired thickness. The material 6 may be wound "cold" onto the thermoplastic liner 1 or may be passed through a heater 12 which, in some applications, results in a more uniform overlay 7 (FIG. 4) with better functional and/or aesthetic characteristics. The resulting structure 11 is then processed further as will be described in detail below.

It has been found to be desirable to suitably vary the feed rate in the regions of the domes and end pieces so that a substantially uniform thickness of he overlay throughout the length of the liner 1 is obtained. Alternative winding techniques for achieving a satisfactorily uniform overlay are well known in the prior art, and reference may be taken, for example, to U.S. Pat. No. 3,282,757 entitled METHOD OF MAKING A FILAMENT REINFORCED PRESSURE VESSEL by Richard C. Brussee, incorporated by reference herein and disclosing various winding techniques which may be employed in the practice of the present invention.

Figure 5A:
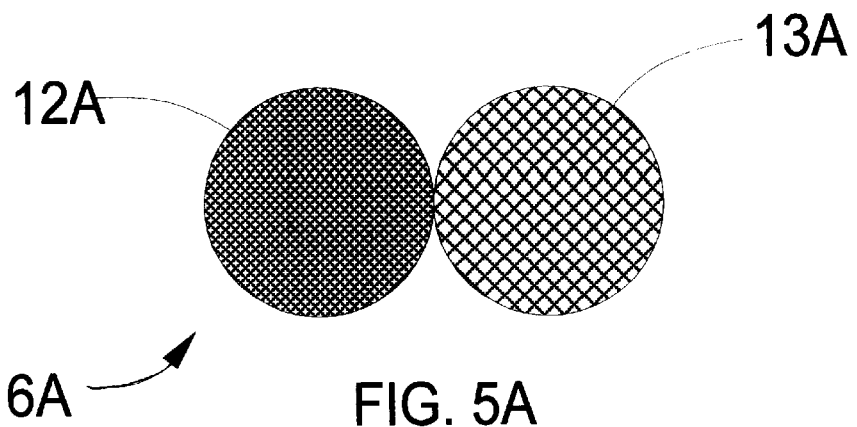
FIGS. 5A, 5B and 5C are cross sectional views taken along the lines 5—5 of FIG. 3 illustrating three variants of a first type of material which can be wound onto the thermoplastic liner to effect the overlayer.

However, the form, and especially the type, of the fiber and thermoplastic material 6 is of significant importance to the practice of the invention such that attention is briefly directed to FIGS. 5A, 5B, 5C, 6A, 6B and 7 which illustrate suitable variants of the material 6 which may be employed in the practice of the invention. In FIG. 5A, separate strands of thermoplastic material 13A and fiber 12A are wound together or separately, but more or less contiguously, as indicated at 6A, onto the liner/mandrel 1. Suitable types of thermoplastic material 13A which may be used in the practice of the invention for this purpose include, but are not limited to, polyethylene, polypropylene, polybutylene terephthalate and polyethylene terephthalate.

Figure 5B:
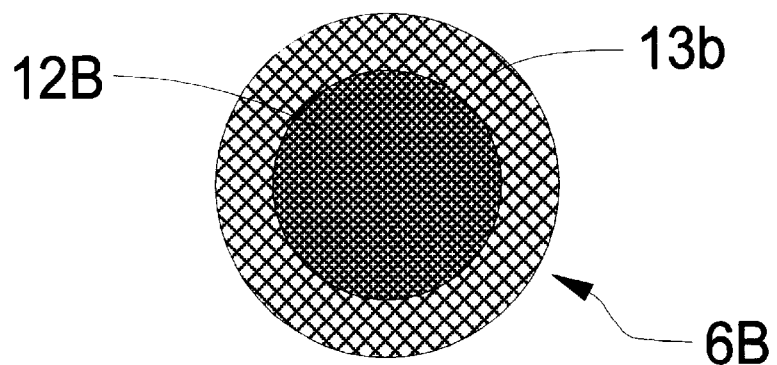
Figure 5C:
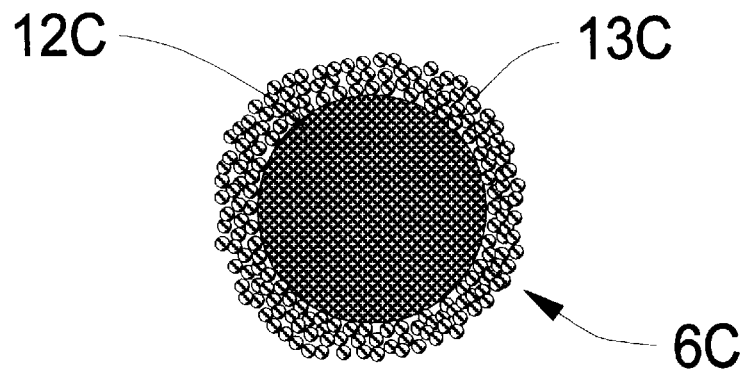

FIG. 5B shows a cross section of a second variant 6B for the material 6 in which the fiber filament 12B is coated with the thermoplastic material 13B by, for example, double extrusion or by any other suitable preliminary process. Similarly, FIG. 5C shows a cross section of a third variant 6B for the material 6 in which the fiber filament 12C is coated with a powder of the thermoplastic material 13C.

Figure 6A:
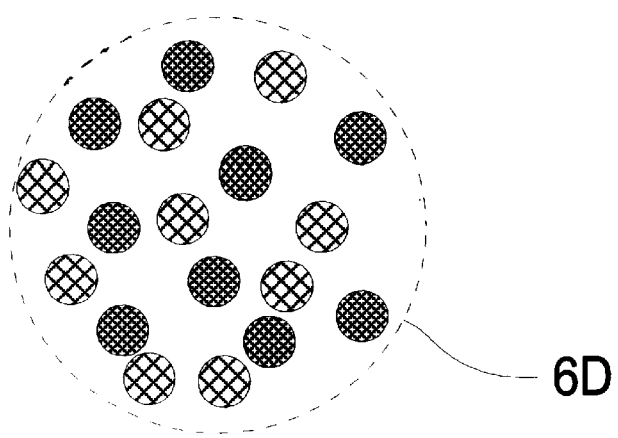
FIG. 6 is a cross sectional view taken a long the lines 6—6 of FIG. 3 illustrating a second type of material, a roving of any one of the three variants illustrated in FIGS. 5A, 5B and 5C, which can be wound onto the thermoplastic liner to effect the overlayer.
Figure 6B:
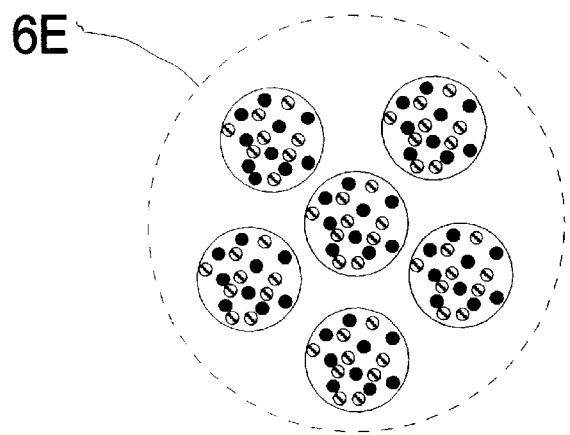
Figure 7:
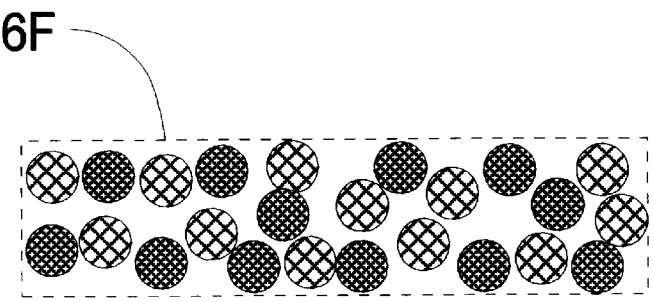
FIG. 7 is a cross sectional view taken along the lines 18—18 of FIG. 3 illustrating a third type of material, a yarn of the second type of material, which can be wound onto the thermoplastic liner to effect the overlayer.

Preferably, however, the fiber 12 and thermoplastic material 13 (in any of the forms shown in FIGS. 5A, 5B, 5C), before winding onto the liner/mandrel 1, are first commingled into a roving 6D as shown in FIG. 6A or into a yarn 6E of such rovings as shown in FIG. 6B. Another preferred configuration for the material 6 is shown in FIG. 7 as a tape 6F of commingled fiber and thermoplastic material. Suitable rovings, yams and tapes of commingled fiber, e.g., fiberglass, and thermoplastic material are commercially available, and one product family which has been found to be well suited for use in the present invention is distributed under the trademark Twintex® by Vetrotex. Twintex is prepared by a proprietary process which involves commingling filaments of fiberglass (e.g., 17 micrometers in diameter) with filaments (e.g., 20 micrometers in diameter) of thermoplastic (e.g., polyethylene or polypropylene) during the continuous production of rovings, yarns and tapes which are available as such and also in the form of fabrics.

Figure 8:
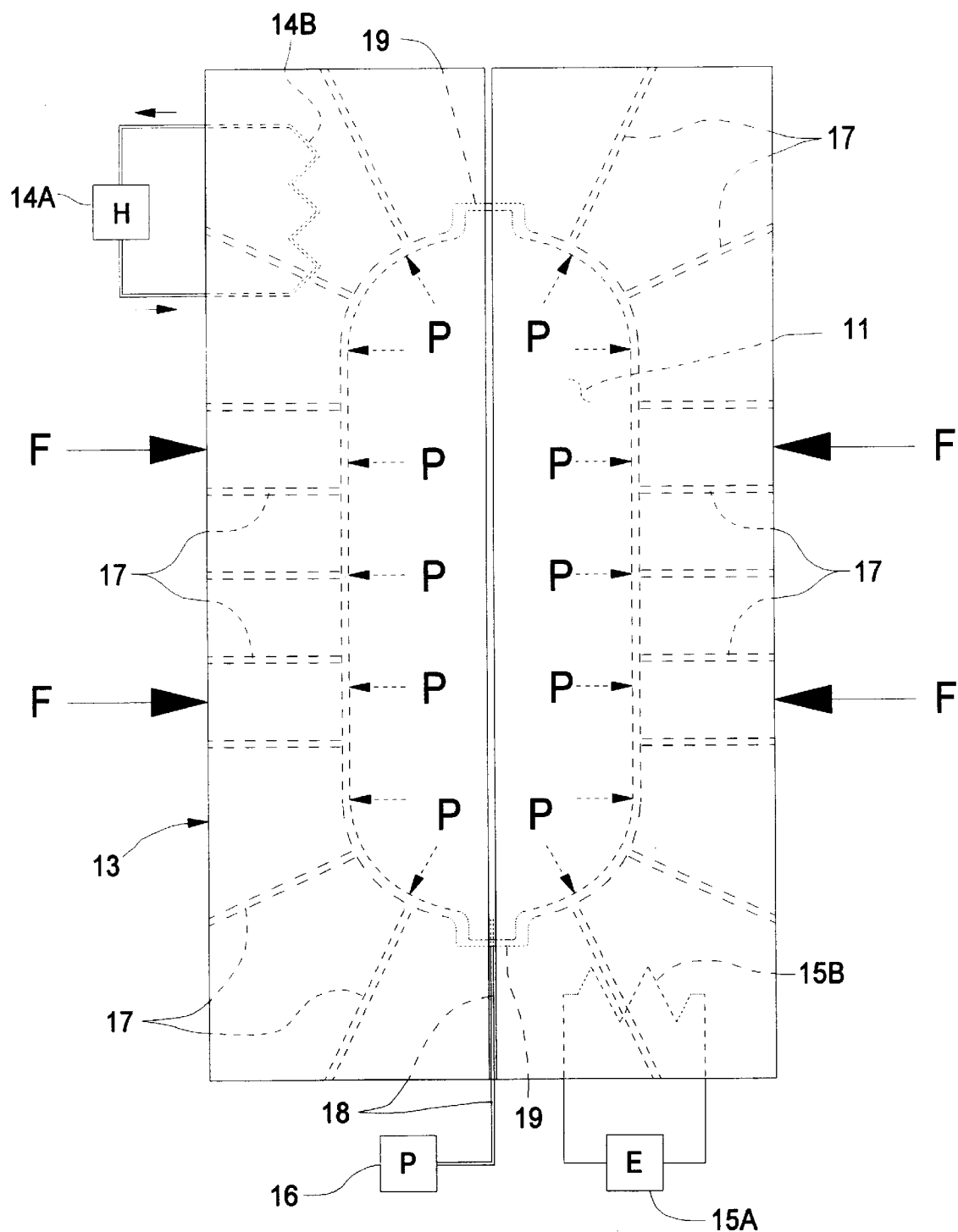
FIG. 8 is a phantom view of a mold showing the modified liner enclosed in a mold in which it is subjected to heat and at least one force tending to urge the modified liner into the shape defined by the inner surface of the mold.
Figure 9:
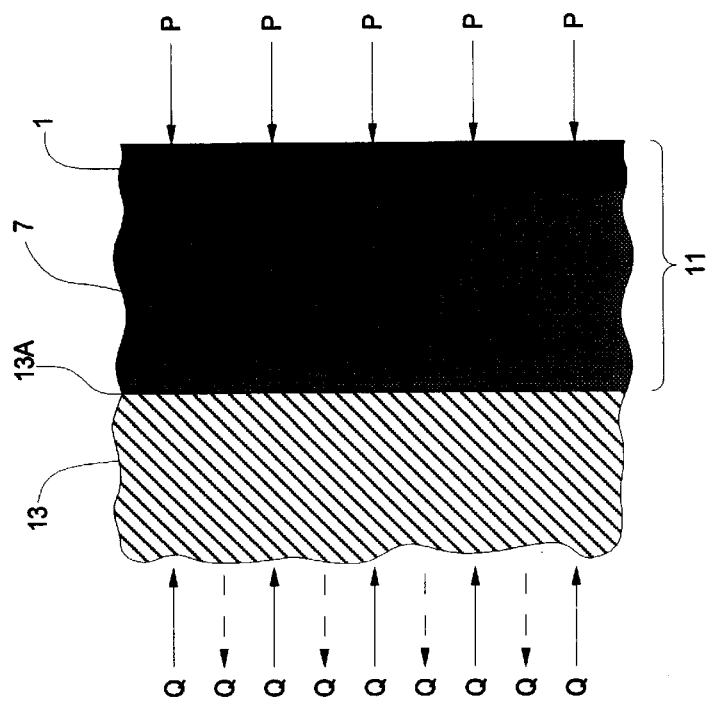
FIG. 9 is an enlarged partial cross sectional view of the modified liner illustrating the effects of the heat and force thereon.

Thus, merely by way of example, the thermoplastic liner/mandrel 1 may, itself, be fabricated from Twintex® fabric which is sewn or welded together and suitably heat treated, for example, in a mold, to obtain the preform which is subsequently wound with the fiber and thermoplastic material 6 to obtain the intermediate structure 11. Referring now to FIG. 8, after the intermediate structure 11 has been prepared as described or in any suitable manner, it is placed in a mold 13 (two-piece in the example). The mold is then heated, for example, by embedded resistance heaters represented by the heater 15B controllably driven from a source E 15A and/or by circulating hot oil, heated by a source H 14A, through coils 14B and/or any other suitable conventional mold-heating expedient. In addition, at least one force is applied to the mold 13 and/or the interior of the intermediate structure 11 which tends to cause the exterior surface of the intermediate structure to conform to the inner surface 13A (FIG. 9) of the mold when the applied heat Q causes the thermoplastic liner 1 and the wound overlay 7 to fuse together and flow against the mold. The force or forces may be generated by applying external compression to the mold halves so as to urge them together as indicated by the arrows designated "F" and/or by pressurizing the interior of the thermoplastic liner 1 by, for example, using gas pressure from a suitable source 16 conveyed into the liner 1 through a conduit 18. If pressurization is employed, caps (threaded or permanent) 19 serve to seal the ends of the intermediate structure 11.

The heat is then removed from the mold 13 allowing the now formed composite pressure vessel to harden and to be removed by opening the mold in the conventional manner.

In practice, two important optional considerations may be taken into account. First, it has been found that the mold should be vented, as represented by the peripherally distributed vents 17 shown in FIG. 8, to allow the trapped air to escape as the pressure vessel forms against the inner wall of the mold and thus achieve a particularly fine finish to the outer surface of the pressure vessel which requires little, if any, further surface finish. Second, in order to be assured of complete fusion between the thermoplastic liner 1 and the wound overlay 7, it has been found preferable to select respective materials with somewhat different melting temperatures for the liner and the overlay. More particularly, the best results are obtained if the heating rate is controlled and the melting point of the liner is selected to be above that of the overlay in order that the thermoplastic material effectively melts around the fiber while the liner is softened, but not fully melted during the molding process. For example, as well known in the art, the melting point range of polypropylene is 300° F. to 330° F. while that of polyethylene is 120° F. to 140° F.

Figure 10:
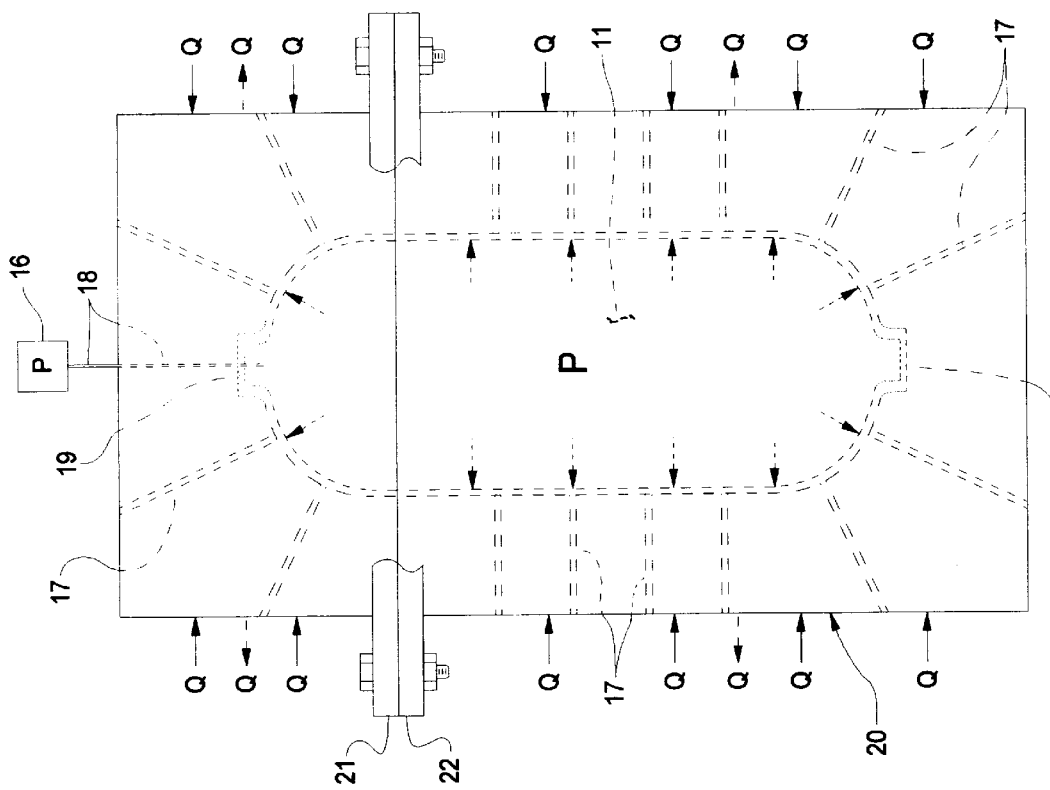
FIG. 10 is a view similar to FIG. 8 showing the modified liner enclosed in a different type of mold.

As shown in FIG. 10, the composite pressure vessel can be fabricated according to a similar process in which a two-piece mold 20, provided with mating flanges 21, 22 which bolt together, is used, thus fully defining a predetermined three dimensional shape for the interior surface of the assembled mold. In this configuration, the intermediate structure 11 is placed into the mold which is assembled. Then, heat Q is applied as described above while the interior of the intermediate structure is pressurized to form the composite pressure vessel. In this variant, there is no need to apply external compressive forces to the mold. Preferably, vents 17 are provided for the reasons noted above.

Figure 11:
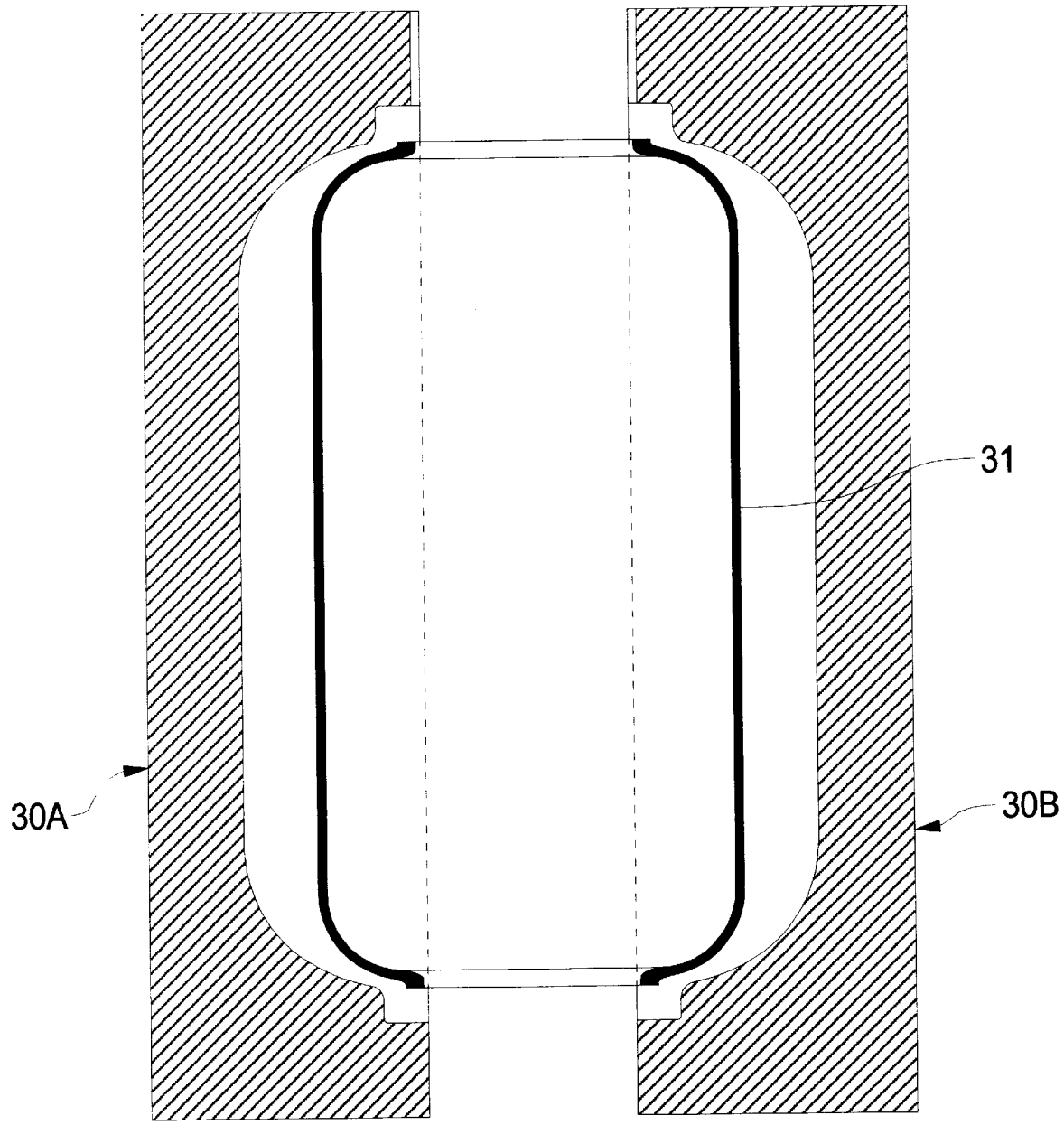
FIG. 11 is a cross sectional view of an open mold containing a preformed thermoplastic component of a pressure vessel fabricated according to a second inventive embodiment.
Figure 12:
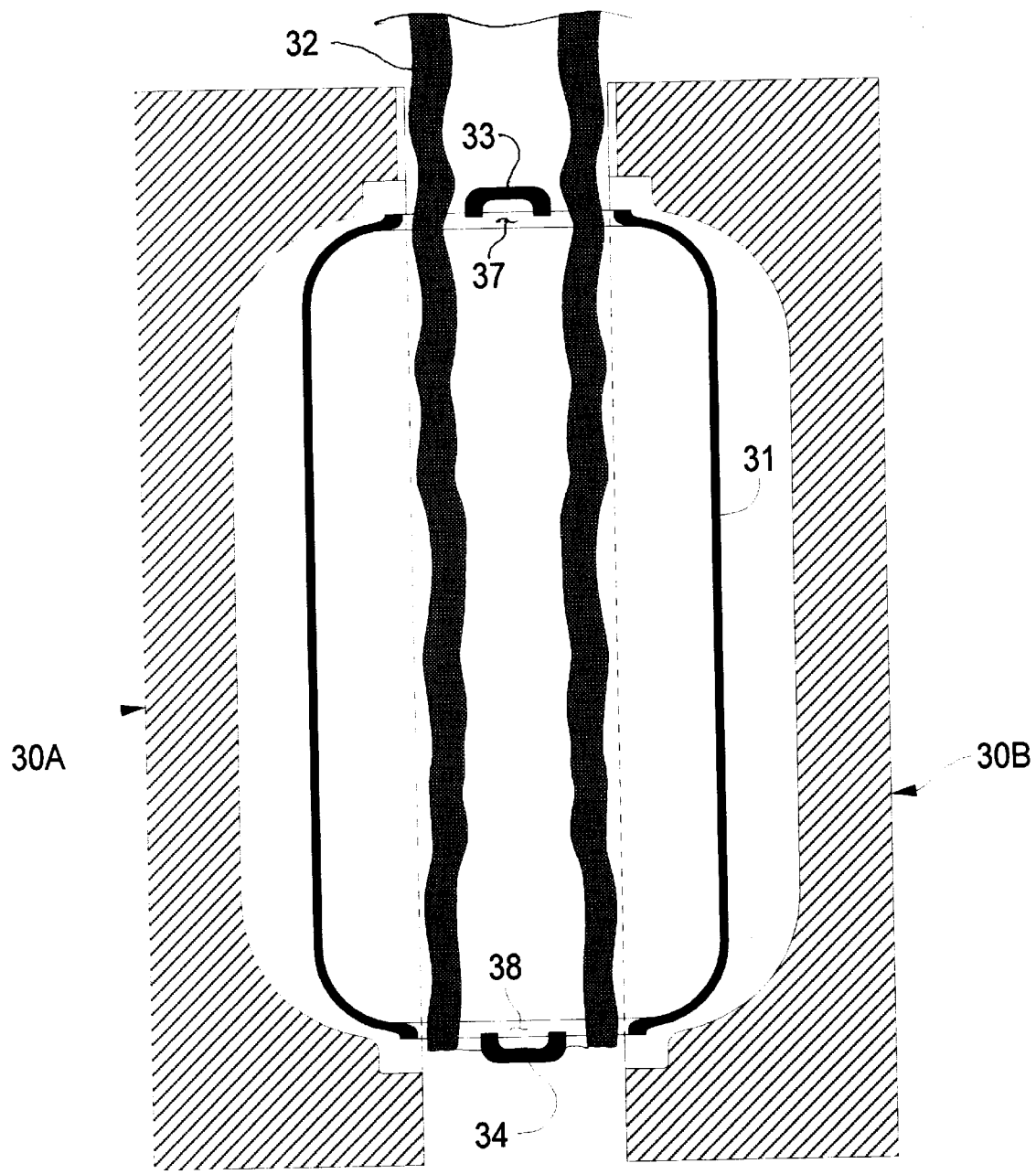
FIG. 12 is a view similar to FIG. 11 illustrating a step in the second inventive embodiment in which a parison of fluid thermoplastic material is introduced into the interior of the preformed component as a second component of a composite pressure vessel to be formed.
Figure 13:
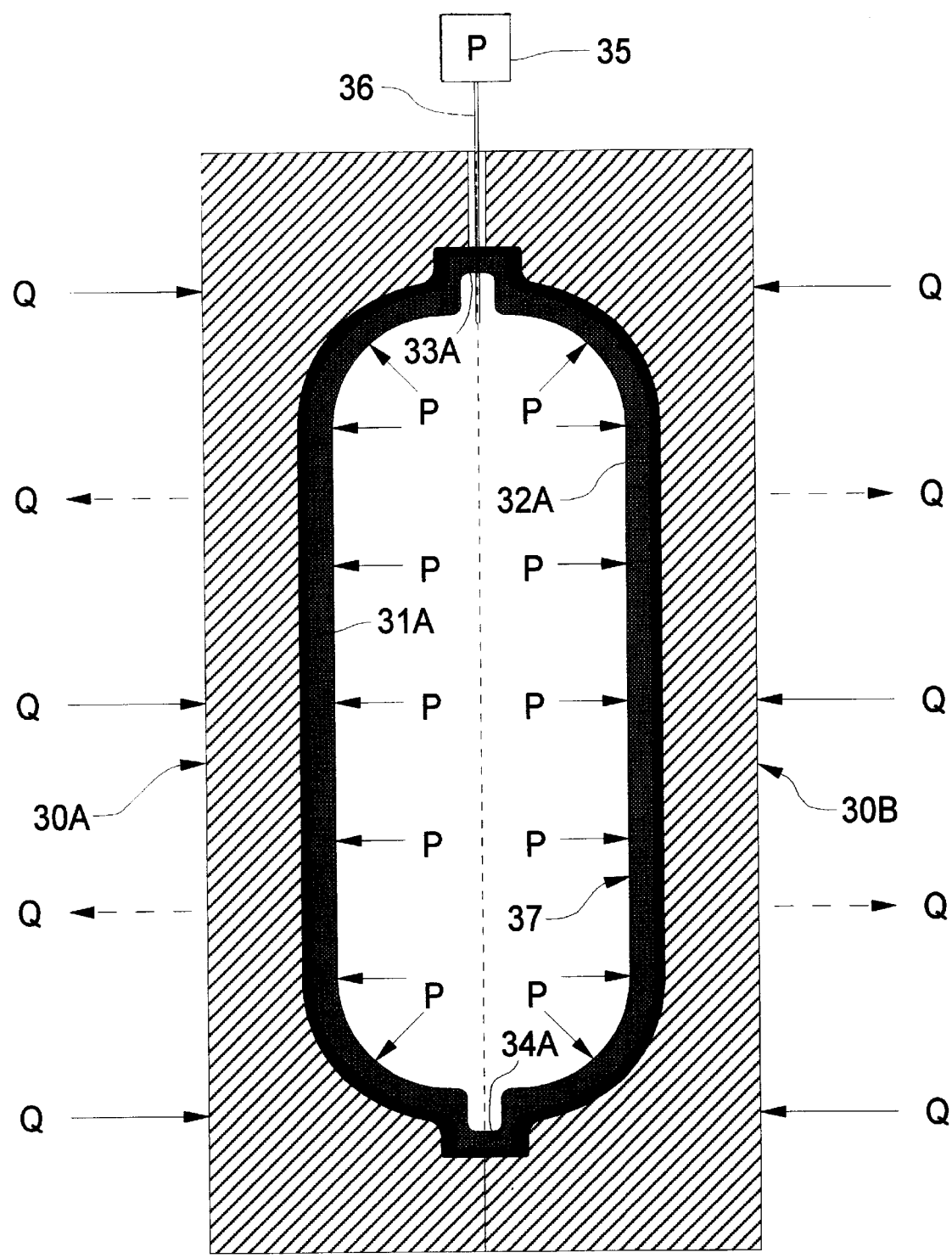
FIG. 13 is a cross sectional view similar to FIGS. 11 and 12, but with the mold closed and the components of the pressure vessel being subjected to a force which forms the pressure vessel against the interior wall of the mold.

FIGS. 11, 12 and 13 illustrate a different, but related, process for fabricating a composite pressure vessel. For clarity, these FIGS. are shown in cross section. Referring to FIG. 11, a preform 31 is placed in a two-piece mold 30A, 30B. The preform 31, which will serve as an outer shell for the composite pressure vessel to be fabricated, may be prepared in the manner previously described for the thermoplastic liner 1, but alternatively may be prepared in the manmer previously described for the intermediate structure 11; i.e., the thermoplastic liner 1 wound with the overlay 7 of fiber and a thermoplastic material.

As shown in FIG. 12, a parison 32 of molten thermoplastic material, such as polyethylene, polypropylene, polybutylene terephthalate and polyethylene terephthalate, is extruded as an elongated tube through an axial opening 37 in the upper end of the preform 31. The material of the parison 32 is selected to form a good bond with a given preform 31. An insert 33, which may be threaded or permanent, is juxtaposed with respect to the axial opening 37 and within the parison 32. Similarly, if the preform 31 includes a second axial opening 38, another insert 34 is juxtaposed in the second opening.

It will be understood by those skilled in the art that the molten parison 32 stores a great deal of latent heat. Thus, referring now to FIG. 13, the mold halves 30A, 30B are closed, and the interior of the parison is pressurized from a source 35 of pressurized gas via conduit 36 such that the thermoplastic material 32A in the parison not only flows against the inner surface of the preform 31A, but also imparts sufficient heat to the preform 31A so as to render it fluid. Consequently, the outer surface of the preform 31A flows to conform to the inner surface of the mold, the inserts 33A, 34A melding with the remainder of the structure or defining removable inserts as may be intended.

If, in a given configuration, there is insufficient latent heat in the parison to bring about complete consolidation of the preform and the thermoplastic material and the intended conformance of the outer surface of the preform to the interior surface of the mold, then additional heat Q can be applied to the mold to complete the formation of the pressure vessel 37. The mold can then be allowed to cool (or be conventionally force cooled) and opened such that the completed pressure vessel can be removed.

Figure 14:
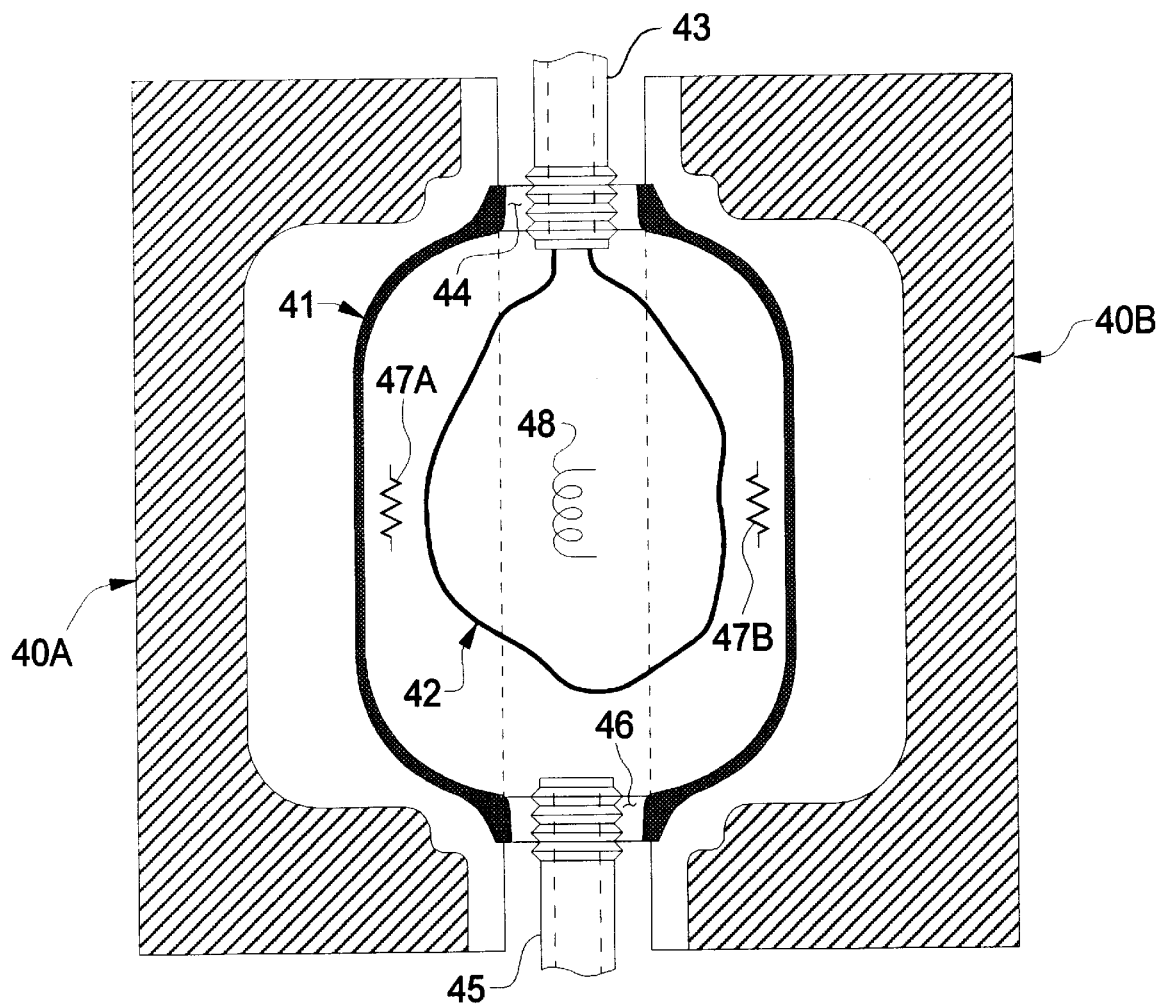
FIG. 14 is a cross sectional view of an open mold containing a preformed thermoplastic component of a pressure vessel fabricated according to a third inventive embodiment and also a thermoplastic liner component disposed in the interior of the first component.
Figure 15:
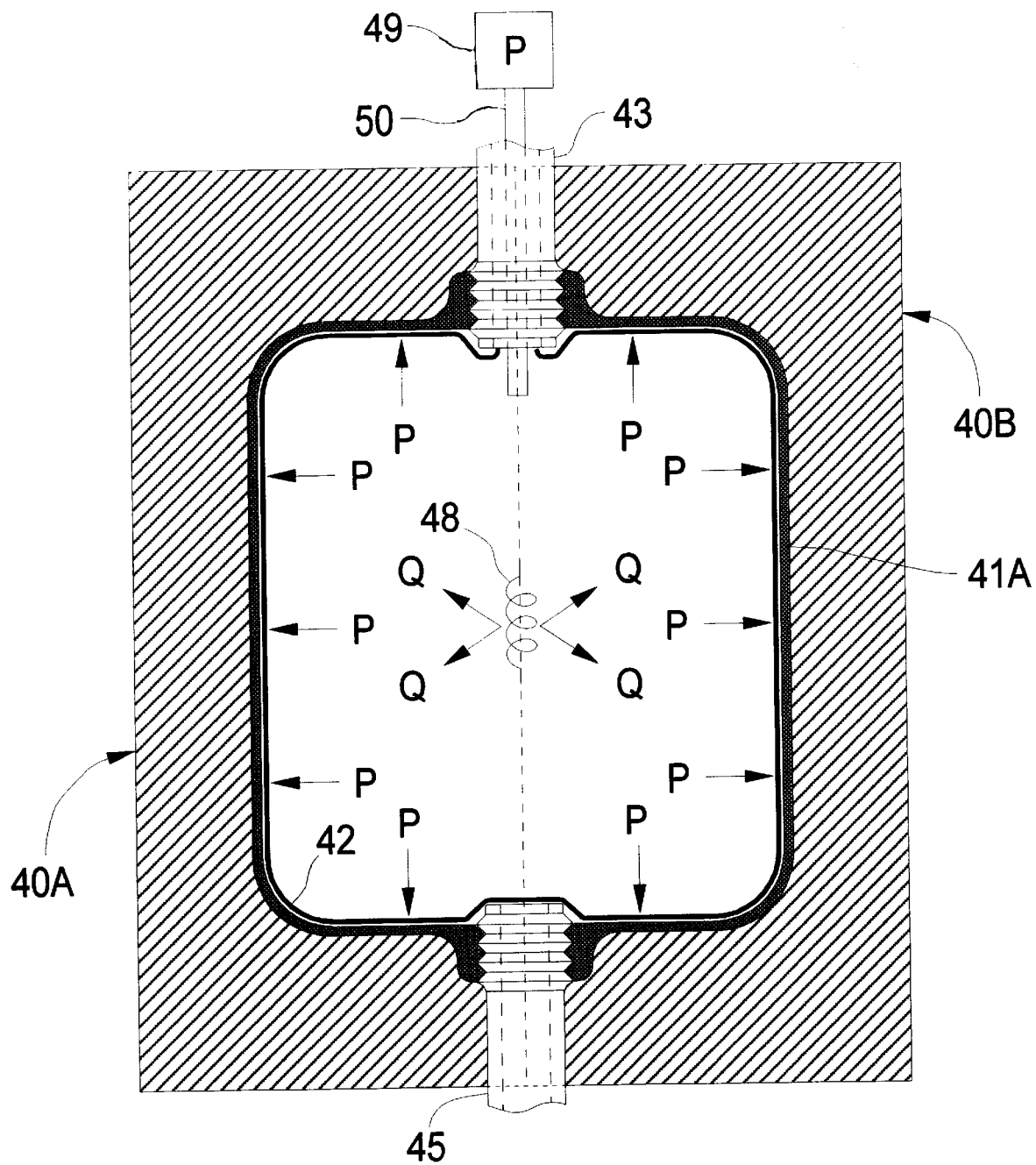
FIG. 15 is a cross sectional view similar to FIG. 14, but with the mold closed and the components of the pressure vessel being subjected to a force which forms the pressure vessel against the interior wall of the mold.
Figure 16:
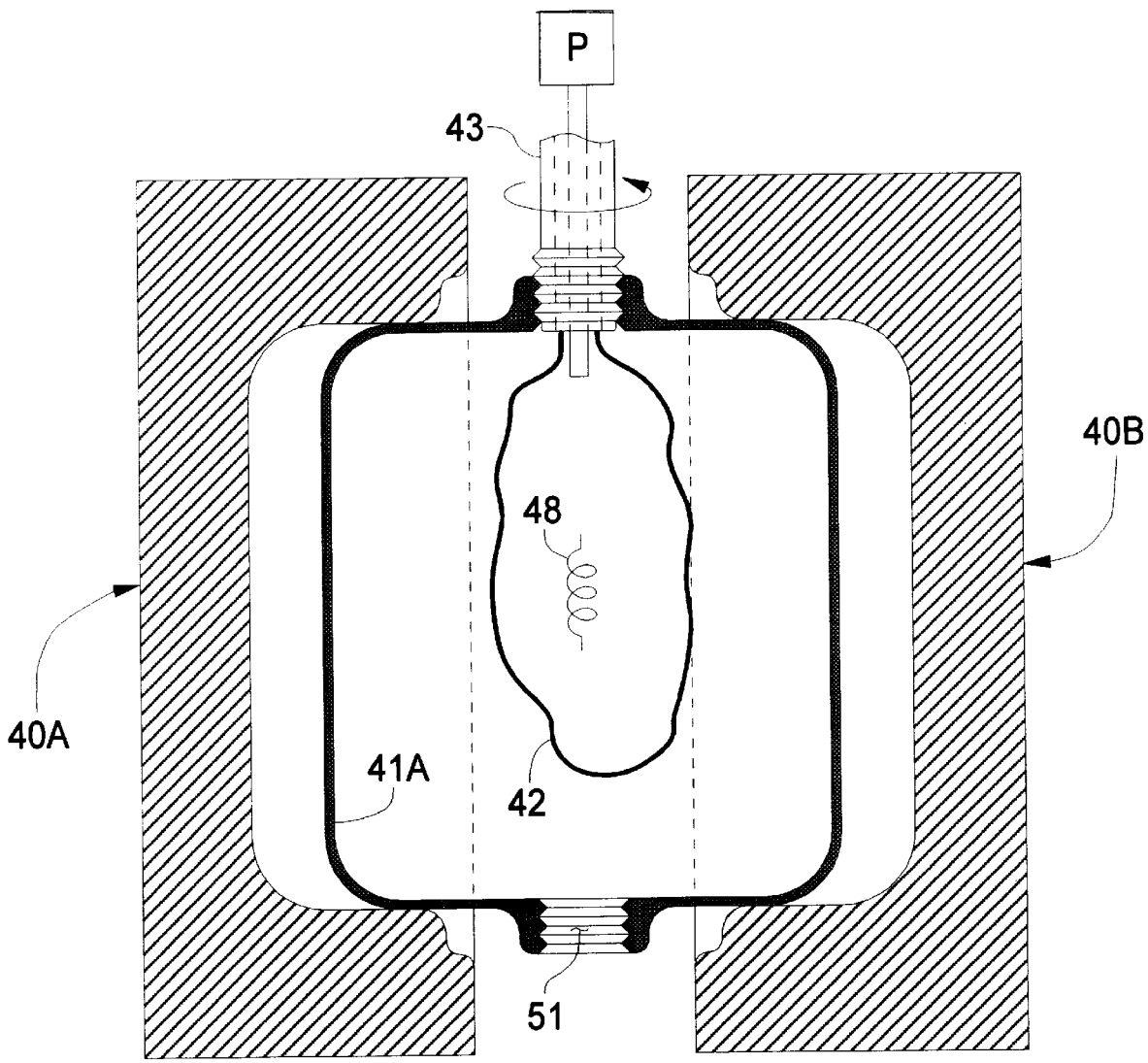
FIG. 16 is a cross sectional view of the completed composite pressure vessel prepared by the process shown in FIGS. 14 and 15.

FIGS. 14, 15 and 16 (shown in cross section) illustrate another molding process for forming a preform 41 into a pressure vessel 41A. Referring first to FIG. 14, the preform 41 may be prepared according to any of the corresponding processes previously described including the process described in conjunction with FIGS. 1–10 which involves winding commingled fiber and a thermoplastic material onto a thermoplastic liner which may, itself, have been prepared by welding or sewing together components of commingled fiber and a thermoplastic material. Or, the preform 41 may be relatively roughly molded from a suitable thermoplastic material such as polyethylene, polypropylene, polybutylene terephthalate and polyethylene terephthalate.

The preform 41, which, in the example, has axial openings 44, 46, is introduced into a two-piece mold 40A, 40B. Then, threaded inserts 43, 45 are juxtaposed in the openings 44, 46. (Of course, inserts such as those 33, 34 employed in the process illustrated in FIGS. 11–13 or some other insert type could alternatively be employed depending upon the precise configuration of the pressure vessel sought.) If threaded inserts are employed, their material is selected to have a melting point which is well above the melting point of the preform 41. At least one of the inserts includes an opening for admitting a silicone rubber inflatable bag 42 into the interior of the preform 48. In addition, a heater 48 is disposed within the inflatable bag 42 which is selected to have heat handling capabilities higher than the melting point of the preform 41. A suitable silicone rubber for the inflatable bag 42 is Mosites 1453D supplied by Mosites Rubber in the United States and Aerovac Systems (Keighley) Ltd. in the United Kingdom.

The heater 48 may be of any suitable type such as a resistance electrical heater, power also being supplied by conductors (not shown) which extend through the opening in the threaded insert 43 and are coupled to a suitable controllable power source (not shown). In addition, provision may be made, if necessary or desirable, for separately preheating the preform 41 such as by providing an array of heaters, represented by the electrical resistance heaters 47A, 47B, proximate the walls of the preform Power to the heaters 47A, 47B may be supplied via conductors (not shown) which extend through one or the other or both of the axial openings 44, 46 in the preform 41 and are coupled to a suitable controllable power source (not shown). The mold 40A, 40B, itself may also be conventionally preheated and/or heated during the molding process.

If the preform 41 is to be preheated (typically to increase the throughput of the process), this step is carried out to render the preform near fluid and the heaters 47A, 47B are withdrawn from the mold 40A, 40B which is then closed. Referring now to FIG. 15, the inflatable silicone rubber bag 42 is inflated by a source 49 of gas under pressure via a conduit 50 while the heater 48 heats the preform 41 to a fluid state through the bag such that bag exerts outwardly directed forces on the preform which therefore flows to conform to the interior surface of the mold 40A, 40B to form the pressure vessel 41A. It will be noted that, in the example, the axial opening regions of the preform flow to conform to the threads of the inserts 43, 45.

The application of heat is then ceased, and when the mold 40A, 40B and formed pressure vessel 41A have sufficiently cooled, the mold is opened, the threaded inserts 43, 45 are unscrewed and the silicone rubber bag 42 and heater 48 are withdrawn leaving the formed pressure vessel. It will be noted that, as represented at 51, internal threads have been formed, as intended in the example, in the axial openings of the formed composite pressure vessel.

In the preparation of some composite pressure vessels, such as household water heaters, the color of the finished product may be of importance. It is, of course, possible to prepare a preform according to any of the previously described processes using material(s) which are already colored. However, there are two potential objections to this straightforward approach; viz.: the precolored raw materials are more expensive, and a limited number of colors are available in the precolored raw materials. However, using the principles of the present invention, color may be imparted to a finished pressure vessel in a different and highly satisfactory manner.

Similarly, there are applications for pressure vessels, such as ultra-pure water storage, gas (e.g., propane, butane, natural gas, etc.) storage and food storage, in which it is desirable to provide an integral impermeable inner liner within a composite pressure vessel. Again, a process for providing such an integral impermeable inner liner may be developed according to the present invention. For convenience, an example, shown in FIGS. 17–20, treats both the provision of a desired external color to a composite pressure vessel as well as the provision of an integral impermeable inner liner. It will be understood that either feature can be individually provided.

Figure 17:
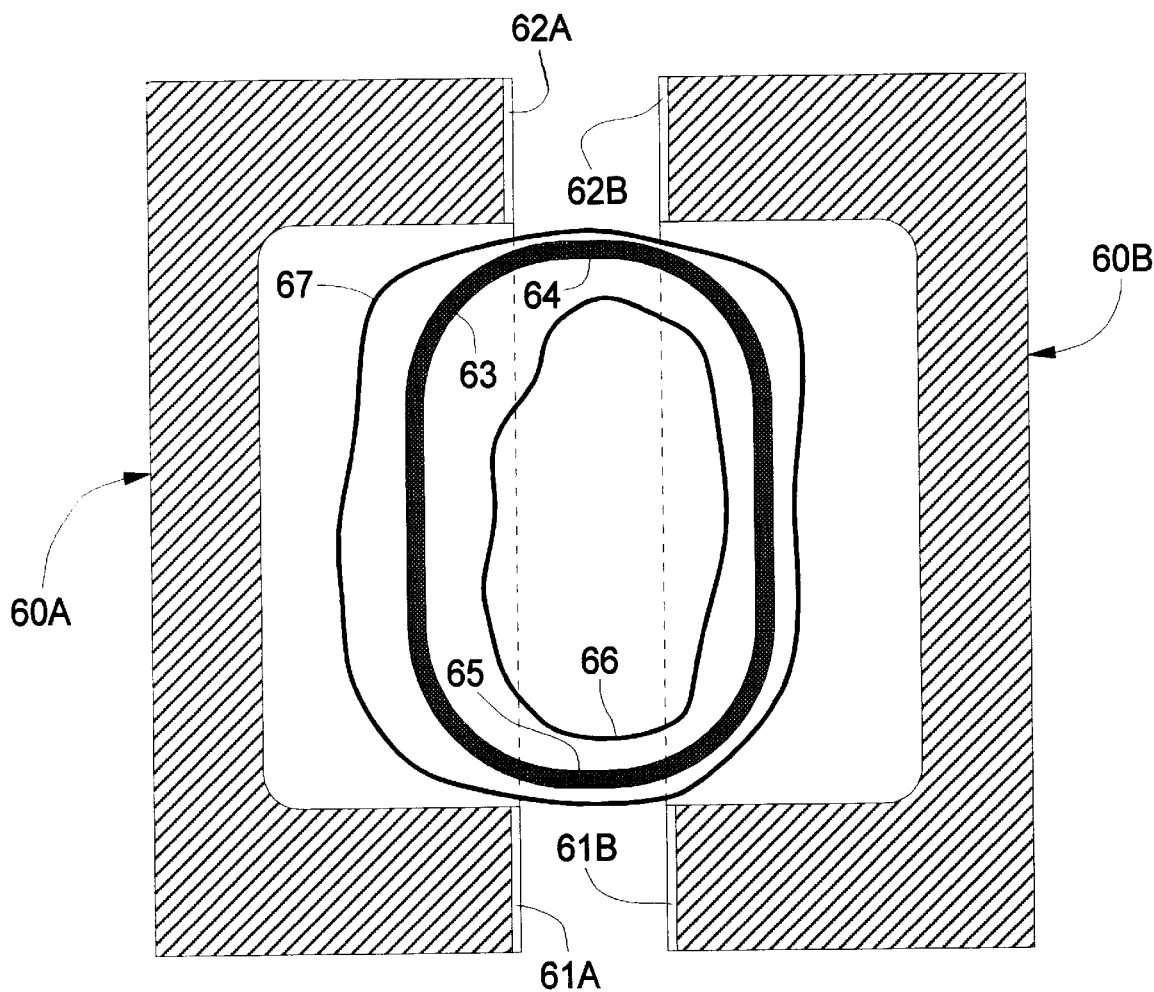
FIG. 17 is a cross sectional view of an open mold containing a preformed thermoplastic component of a pressure vessel fabricated according to a fourth inventive embodiment and also an outer liner component disposed exterior to the first component and an inner liner component disposed in the interior of the first component.

Thus, referring to FIG. 17, an assembly including a preform 63 (fabricated according to any of the previously described methods), surrounded by a film 67 of thermoplastic material of the desired product color, is introduced into a two-piece mold 60A, 60B. If an integral impermeable inner liner is to be implemented, a thermoplastic film 66 having the desired characteristics is introduced into the interior of the preform 63 before inserts 64, 65 are suitably juxtaposed. The mold 60A, 60B includes respective facing relieved sections 61A, 61B and 62A, 62B which, when the mold is closed, provides passages into the mold interior.

Figure 18:
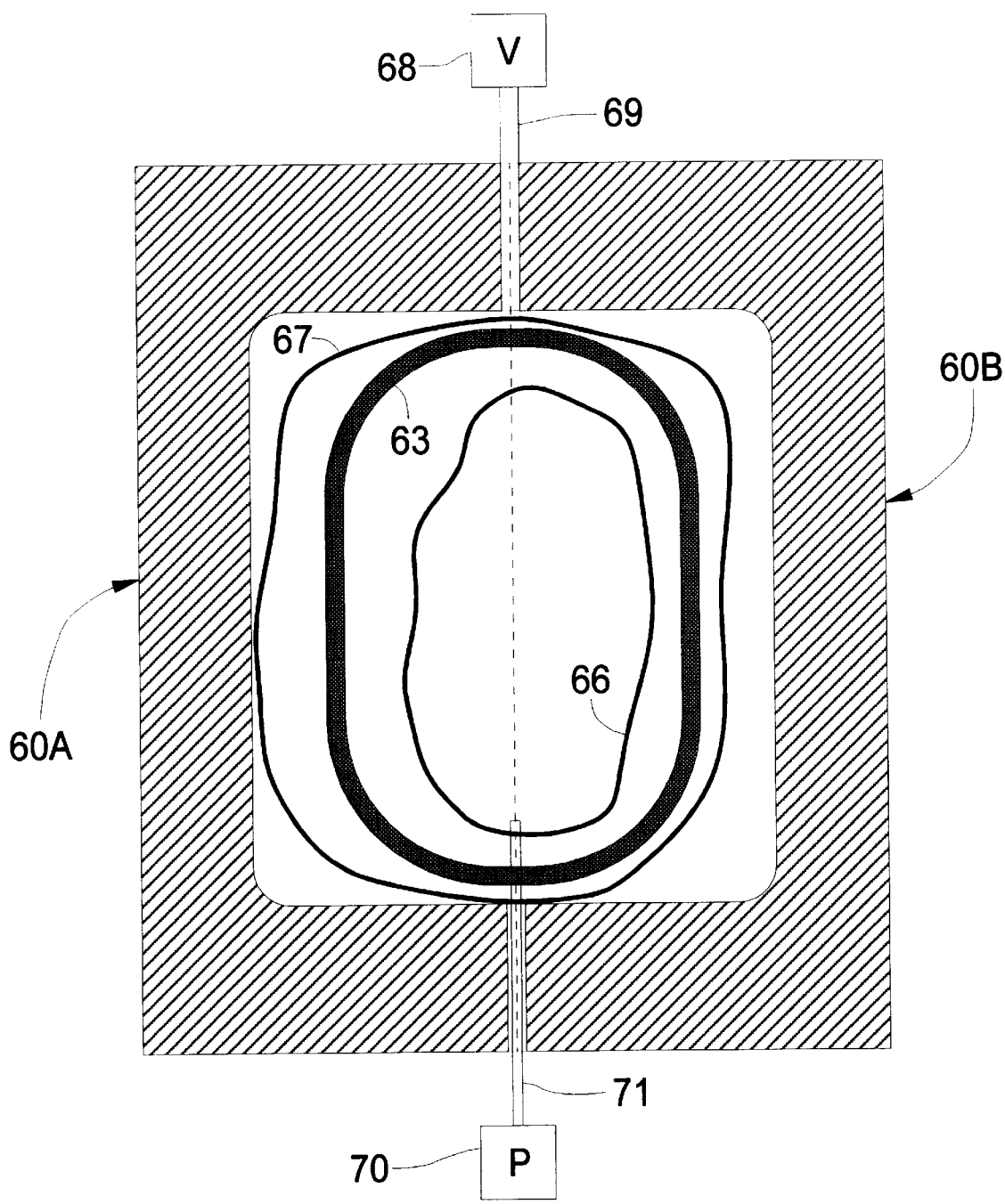
FIG. 18 is a view similar to FIG. 17, but with the mold closed and force producing components coupled to the mold.
Figure 19:
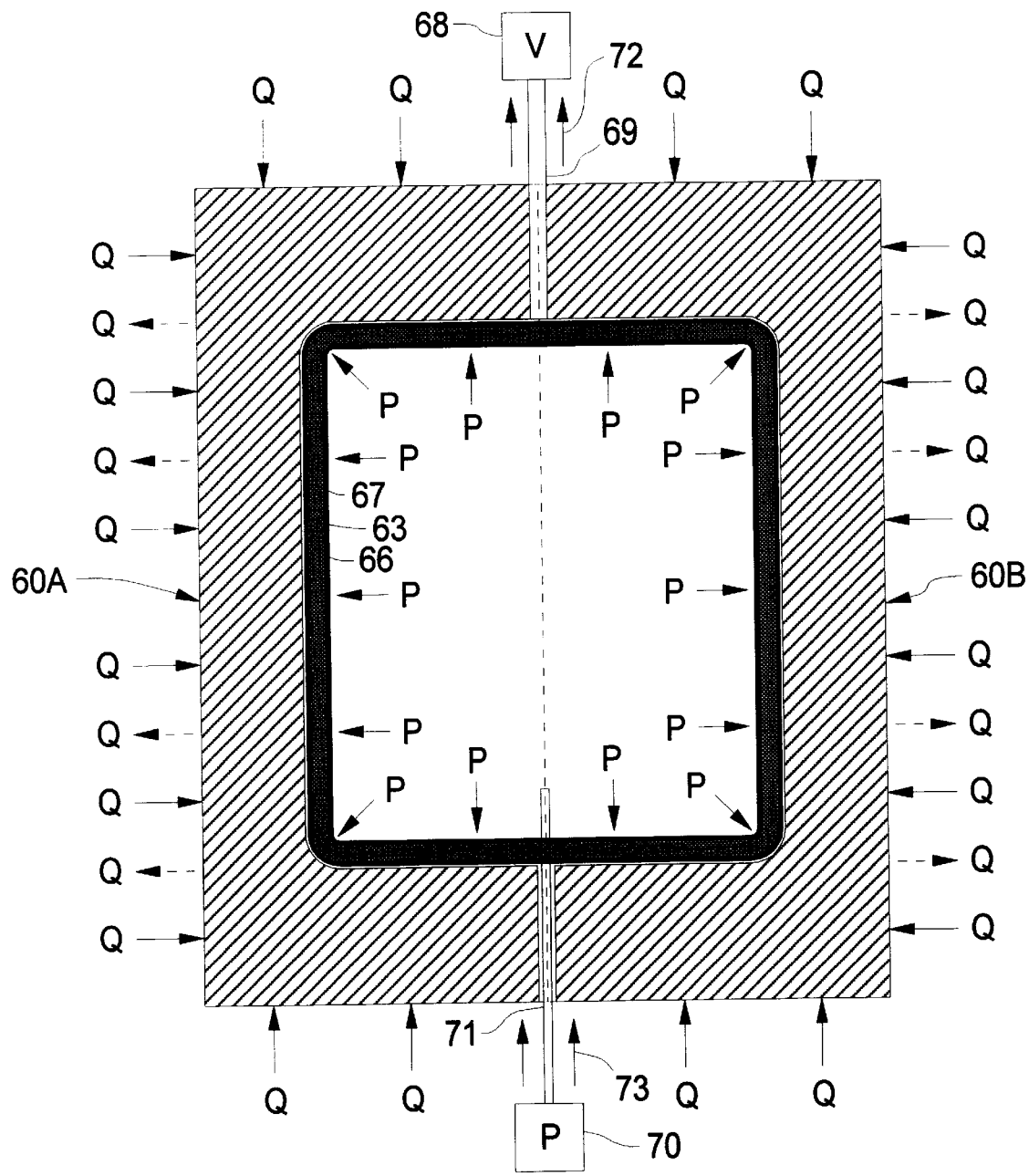
FIG. 19 is a view similar to FIG. 18 showing the pressure vessel being formed in the mold under the influence of heat and one or more forces which urge the pressure vessel components to conform to the contours of the inner wall of the mold.
Figure 20:
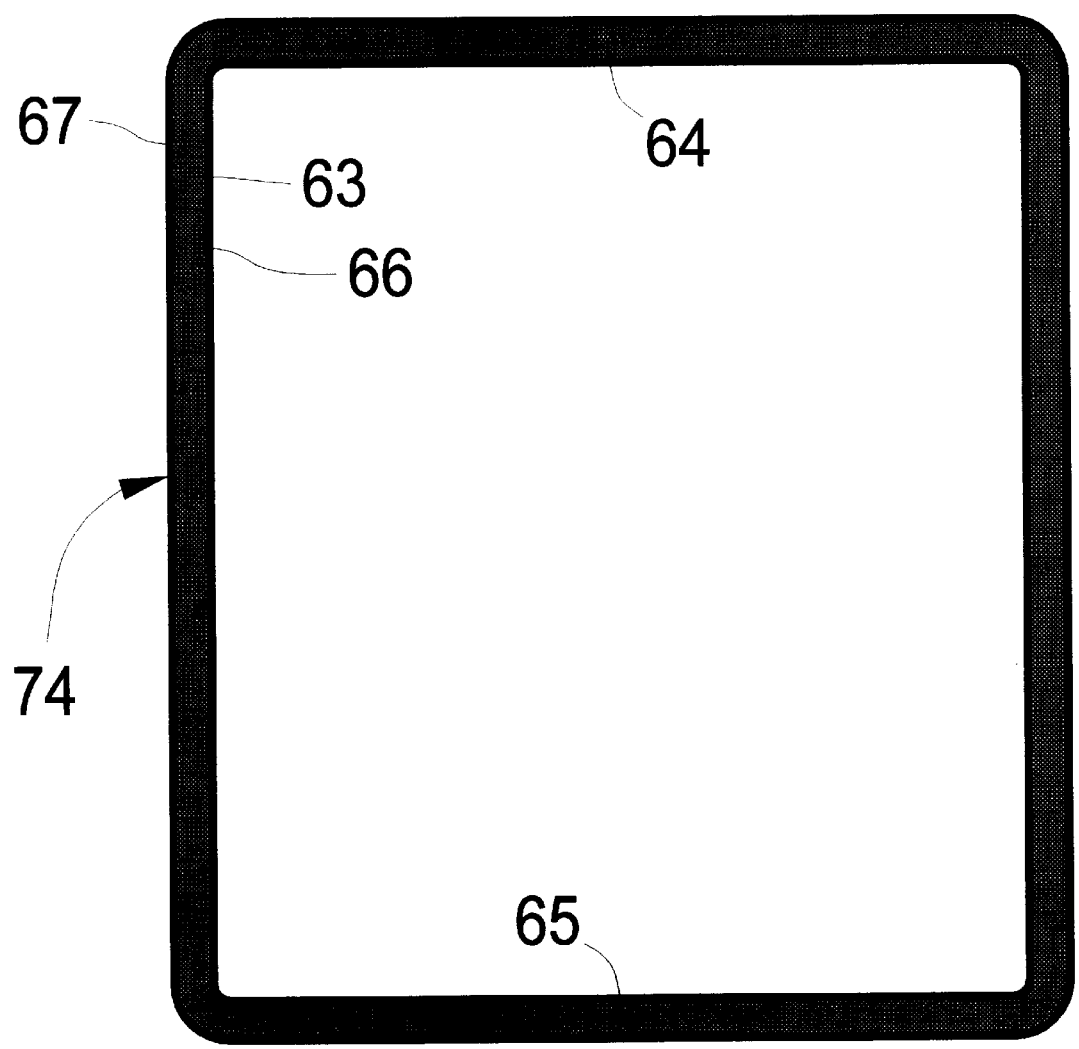
FIG. 20 is a cross sectional view of the completed composite pressure vessel prepared by the process shown in FIGS. 17, 18 and 19.

Referring now to FIG. 18, the mold 60A, 60B is closed, and the interior of the mold is coupled to a vacuum source 68 via a conduit 69. Alternatively, or additionally, the interior of the inner liner 66 (or the interior of the preform 63 if no inner liner is to be incorporated) is coupled to a source 70 of gas under pressure via a conduit 71. As shown in FIG. 19, heat Q is applied to the mold in order to bring all the constituents of the composite pressure vessel to be formed to a fluid state while the interior of the mold is evacuated as represented by the arrows 72 and the interior of the inner liner 66 (or of the preform 63 if there is no inner liner) is pressurized as represented by the arrows 73. Consequently, the three (or two) components consolidate and the outer surface of the colored film 67 conforms to the shape of the interior of the mold 60A, 60B. After the mold has been allowed to cool (or force cooled) and has been opened, the resulting composite pressure vessel 74, shown in FIG. 20 (as a cross section slice), is ready for any subsequent processing. As previously noted, of course, the inserts 64, 65, can be threaded for subsequent removal leaving one or two axial openings as may be appropriate for the intended purpose of the composite pressure vessel.

Figure 21:
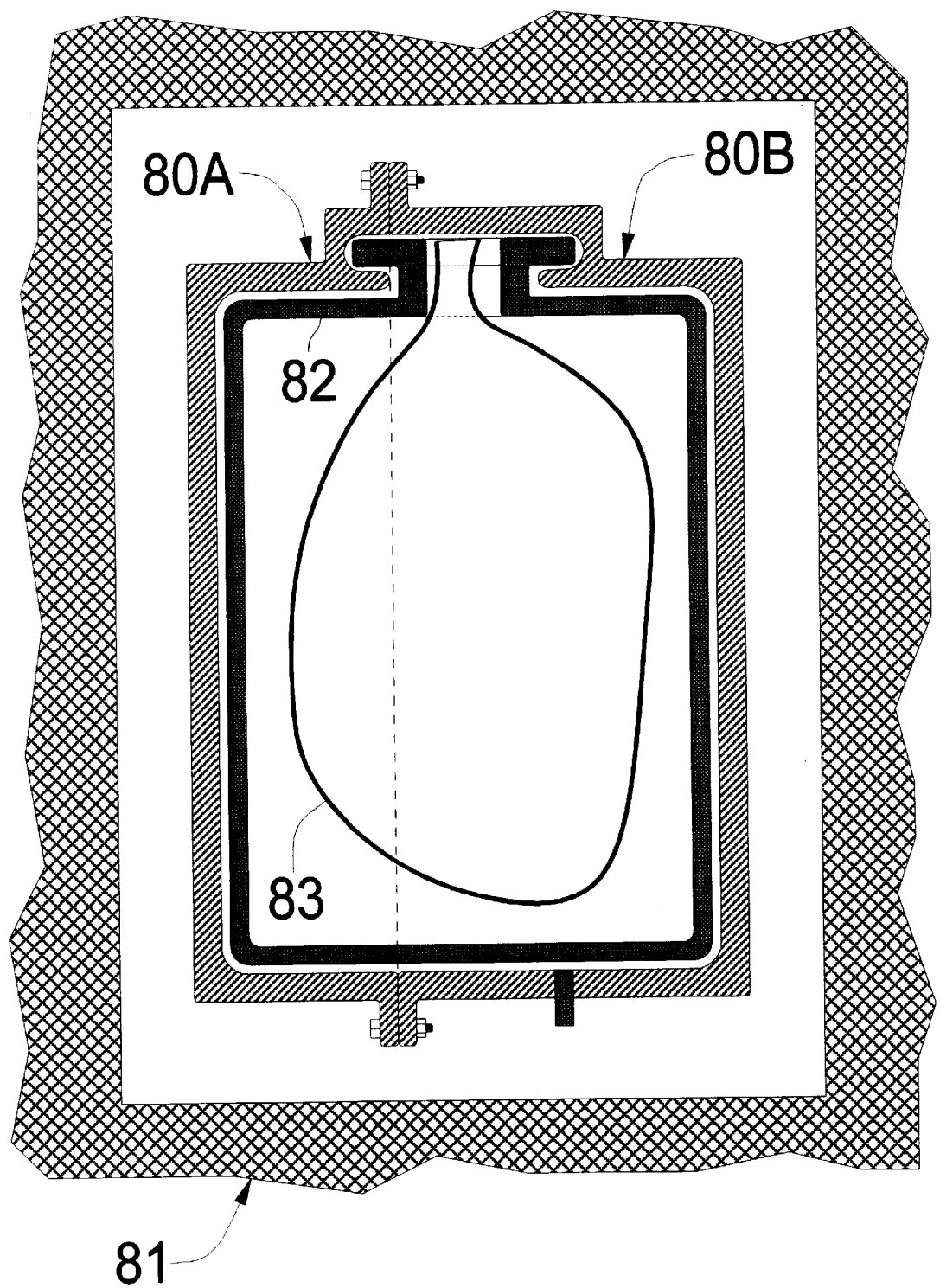
FIG. 21 is a cross sectional view of a mold containing a preformed thermoplastic component of a pressure vessel already provided with a thermoplastic liner, the pressure vessel to be fabricated according to a fifth inventive embodiment.
Figure 22:
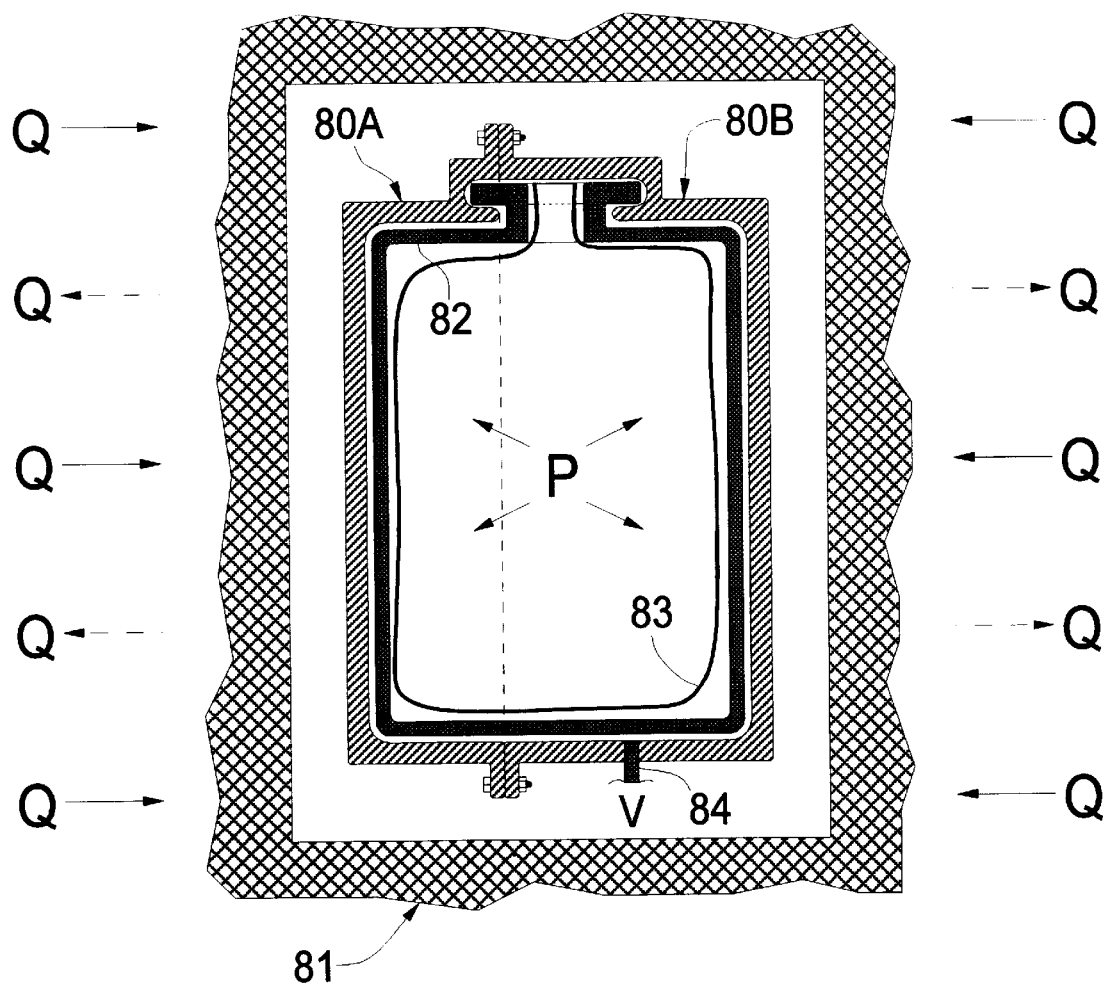
FIG. 22 is a view similar to FIG. 21 showing the pressure vessel being formed in the mold under the influence of heat and one or more forces which urge the pressure vessel components to conform to the contours of the inner wall of the mold.
Figure 23:
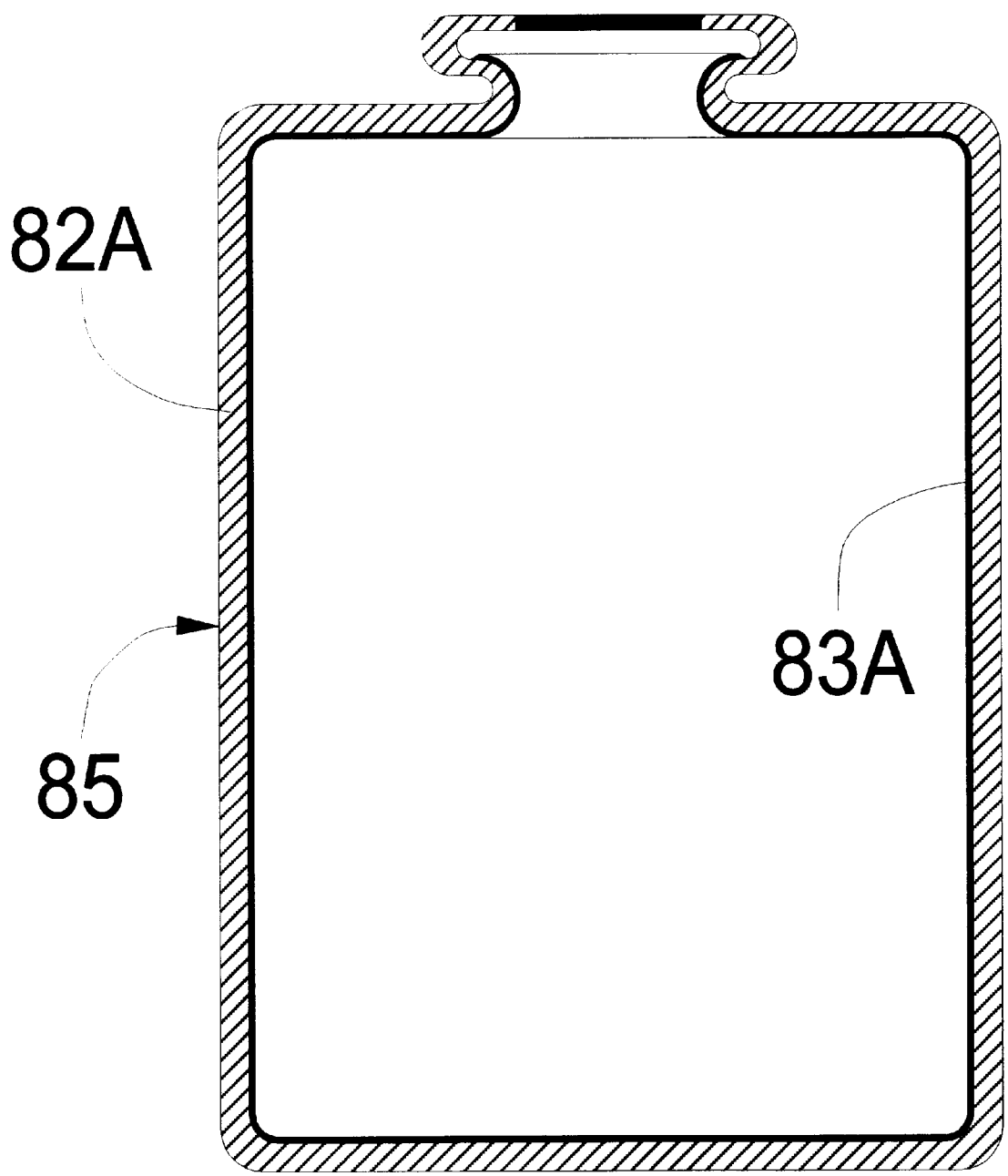
FIG. 23 is a cross sectional view of the completed composite pressure vessel prepared by the process shown in FIGS. 21 and 22.

A similar process for fabricating a pressure vessel is illustrated in FIGS. 21–23 FIG. 21 shows a two-piece mold 80A, 80B which may be, for example, a simple sheet metal mold such that a number of pressure vessels may be formed simultaneously. The mold, which is shown emplaced in a suitable oven 81, has been loaded with a preform 82 fabricated according to any of the methods and of any of the materials and/or combinations of materials previously described above and having at least one opening for access to the interior thereof. A thermoplastic film bag 83, which is intended to function as an integral liner in the completed pressure vessel, is introduced into the interior of the preform 82 before the mold 80A, 80B is closed.

Referring now to FIG. 22, as heat Q is transferred from the oven 81 to the mold 80A, 80B, gas pressure P (from any suitable source, not shown) is applied to the interior of the thermoplastic film bag 83, thereby biasing it toward the inner surface of the preform 82. In addition, vacuum V (from any suitable source, not shown) is pulled on the interior of the mold 80A, 80B and thus exterior to the preform 82. This state is continued until the plastic materials of the preform 82 and plastic film bag consolidate and the outer surface of the composite structure assumes the shape of the interior of the mold. Then, the mold is taken from the oven 81, allowed to cool and opened to remove the completed composite pressure vessel 85 which is shown in FIG. 23 as made up of the integral structure including the molded preform 82A and the plastic film liner 83A which has fused to the interior of the composite pressure vessel.

Composite pressure vessels fabricated in accordance with all the processes disclosed above have performance and aesthetic characteristics significantly improved over those fabricated with the prior art processes. More particularly, they can withstand higher pressures and temperatures, are more impact resistant and exhibit a significantly better finish. They also have good machinability attributes and can therefore readily be welded, cut, drilled, threaded, stamped or the like as may be desired to produce a high quality finished product.

Thus, while the principles of the invention have now been made clear in illustrative embodiments, there will be immediately obvious to the those skilled in the art many modifications of structure and components used in the practice of the invention which are particularly adapted for specific environments and operating requirements without departing from those principles.

What is claimed is:

1. A process of making a composite vessel comprising the steps of:
   A) preforming a composite thermoplastic shell for the vessel, which composite thermoplastic shell has at least one opening for access to the interior thereof;
   B) placing the composite thermoplastic shell into a mold;
   C) introducing an inflatable bag containing a heater into the composite thermoplastic shell through the at least one opening therein;
   D) heating the inflatable bag to a temperature which is sufficient to render the composite thermoplastic shell fluid while pressurizing the interior thereof such that the exterior surface of the inflatable bag bears against the interior surface of the composite thermoplastic shell;
   E) continuing step D) until the composite thermoplastic shell forms against the interior walls of the mold;
   F) ceasing heating the inflatable bag and allowing the formed composite vessel to cool;
   G) removing the inflatable bag from the interior of the formed composite vessel; and
   H) removing the formed composite vessel from the mold.

2. The process of claim 1 in which the mold is preheated prior to step D).

3. The process of claim 1 in which the composite thermoplastic shell is preheated prior to step D).

4. The process of claim 2 in which the composite thermoplastic shell is preheated prior to step D).

5. The process of claim 1 in which, prior to step C), an insert having an opening is juxtaposed in alignment with the at least one opening in the composite thermoplastic shell and in which, during step C), the inflatable bag is inserted into the interior of the composite thermoplastic shell through the opening in the insert.

6. The process of claim 2 in which, prior to step C), an insert having an opening is juxtaposed in alignment with the at least one opening in the composite thermoplastic shell and in which, during step C), the inflatable bag is inserted into the interior of the composite thermoplastic shell through the opening in the insert.

7. The process of claim 3 in which, prior to step C), an insert having an opening is juxtaposed in alignment with the at least one opening in the composite thermoplastic shell and in which, during step C), the inflatable bag is inserted into the interior of the composite thermoplastic shell through the opening in the insert.

8. The process of claim 4 in which, prior to step C), an insert having an opening is juxtaposed in alignment with the at least one opening in the composite thermoplastic shell and in which, during step C), the inflatable bag is inserted into the interior of the composite thermoplastic shell through the opening in the insert.

9. The process of claim 5 in which at least a portion of the exterior surface of the insert is threaded such that, during step E), threads are formed in the at least one opening of the composite thermoplastic shell and, subsequent to step F), the insert can be unscrewed and separated from the formed composite vessel.

10. The process of claim 6 in which at least a portion of the exterior surface of the insert is threaded such that, during step E), threads are formed in the at least one opening of the composite thermoplastic shell and, subsequent to step F), the insert can be unscrewed and separated from the formed composite vessel.

11. The process of claim 7 in which at least a portion of the exterior surface of the insert is threaded such that, during step E), threads are formed in the at least one opening of the composite thermoplastic shell and, subsequent to step F), the insert can be unscrewed and separated from the formed composite vessel.

12. The process of claim 8 in which at least a portion of the exterior surface of the insert is threaded such that, during step E), threads are formed in the at least one opening of the composite thermoplastic shell and, subsequent to step F), the insert can be unscrewed and separated from the formed composite vessel.

13. The process of claim 1 in which said composite shell is fabricated by winding a fiber and thermoplastic material onto a thermoplastic liner.

14. The process of claim 2 in which said composite shell is fabricated by winding a fiber and thermoplastic material onto a thermoplastic liner.

15. The process of claim 3 in which said composite shell is fabricated by winding a fiber and thermoplastic material onto a thermoplastic liner.

16. The process of claim 4 in which said composite shell is fabricated by winding a fiber and thermoplastic material onto a thermoplastic liner.

17. The process of claim 5 in which said composite shell is fabricated by winding a fiber and thermoplastic material onto a thermoplastic liner.

18. The process of claim 6 in which said composite shell is fabricated by winding a fiber and thermoplastic material onto a thermoplastic liner.

19. The process of claim 7 in which said composite shell is fabricated by winding a fiber and thermoplastic material onto a thermoplastic liner.

20. The process of claim 8 in which said composite shell is fabricated by winding a fiber and thermoplastic material onto a thermoplastic liner.

21. The process of claim 9 in which said composite shell is fabricated by winding a fiber and thermoplastic material onto a thermoplastic liner.

22. The process of claim 10 in which said composite shell is fabricated by winding a fiber and thermoplastic material onto a thermoplastic liner.

23. The process of claim 11 in which said composite shell is fabricated by winding a fiber and thermoplastic material onto a thermoplastic liner.

24. The process of claim 12 in which said composite shell is fabricated by winding a fiber and thermoplastic material onto a thermoplastic liner.

* * * * *